(12) United States Patent
Lin

(10) Patent No.: US 8,467,058 B2
(45) Date of Patent: Jun. 18, 2013

(54) LIGHT SOURCE ASSEMBLY AND RELATED LENS TESTING DEVICE

(75) Inventor: I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 431 days.

(21) Appl. No.: 12/791,879

(22) Filed: Jun. 2, 2010

(65) Prior Publication Data

US 2011/0188264 A1    Aug. 4, 2011

(30) Foreign Application Priority Data

Feb. 3, 2010    (CN) .......................... 2010 1 0301147

(51) Int. Cl.
*G01B 11/00*    (2006.01)
(52) U.S. Cl.
USPC ........................................................ 356/401

(58) Field of Classification Search
USPC ........................................ 356/124, 399–401
See application file for complete search history.

(56) References Cited

U.S. PATENT DOCUMENTS

2009/0033611 A1 *   2/2009   Mizumaki ..................... 345/102

FOREIGN PATENT DOCUMENTS

| CN | 200941146 Y | 8/2007 |
|---|---|---|
| CN | 201015079 Y | 1/2008 |

* cited by examiner

*Primary Examiner* — Tara S Pajoohi Gomez
(74) *Attorney, Agent, or Firm* — Altis Law Group, Inc.

(57) ABSTRACT

A lens testing device includes a light source assembly, a pattern plate, and an imaging sensor. The light source assembly includes a transparent base plate, a light guide plate, and a number of illuminants. The light source assembly uses the light guide plate to uniformize a light come from the illuminants and emit the light onto the pattern plate. The imaging sensor is placed beneath the transparent base plate to sense the light passing through the pattern plate and focused by a lens.

10 Claims, 5 Drawing Sheets

US 8,467,058 B2

LIGHT SOURCE ASSEMBLY AND RELATED LENS TESTING DEVICE

BACKGROUND

1. Technical Field

The present disclosure relates to a light source assembly and a lens testing device having the light source assembly.

2. Description of Related Art

Generally, every lens needs to pass a modulation transfer function test to ensure the optical quality thereof. A lens testing device for testing a modulation transfer function of a lens usually includes a number of light tubes, a testing pattern plate, and an image sensor. The light tubes are configured for illuminating a testing image formed on the testing pattern plate. The testing image of the testing pattern plate is acquired by the image sensor through the lens to calculate a modulation transfer function of the lens.

In a typical lens testing device, the testing pattern plate is directly illuminated by the light tubes. However, the outer environment easily affects the light coming out from the light tubes. Thus, the uniformity of luminance on the testing pattern plate is less than satisfactory.

Therefore, it is desirable to provide a light source assembly which can overcome the above-mentioned problems.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
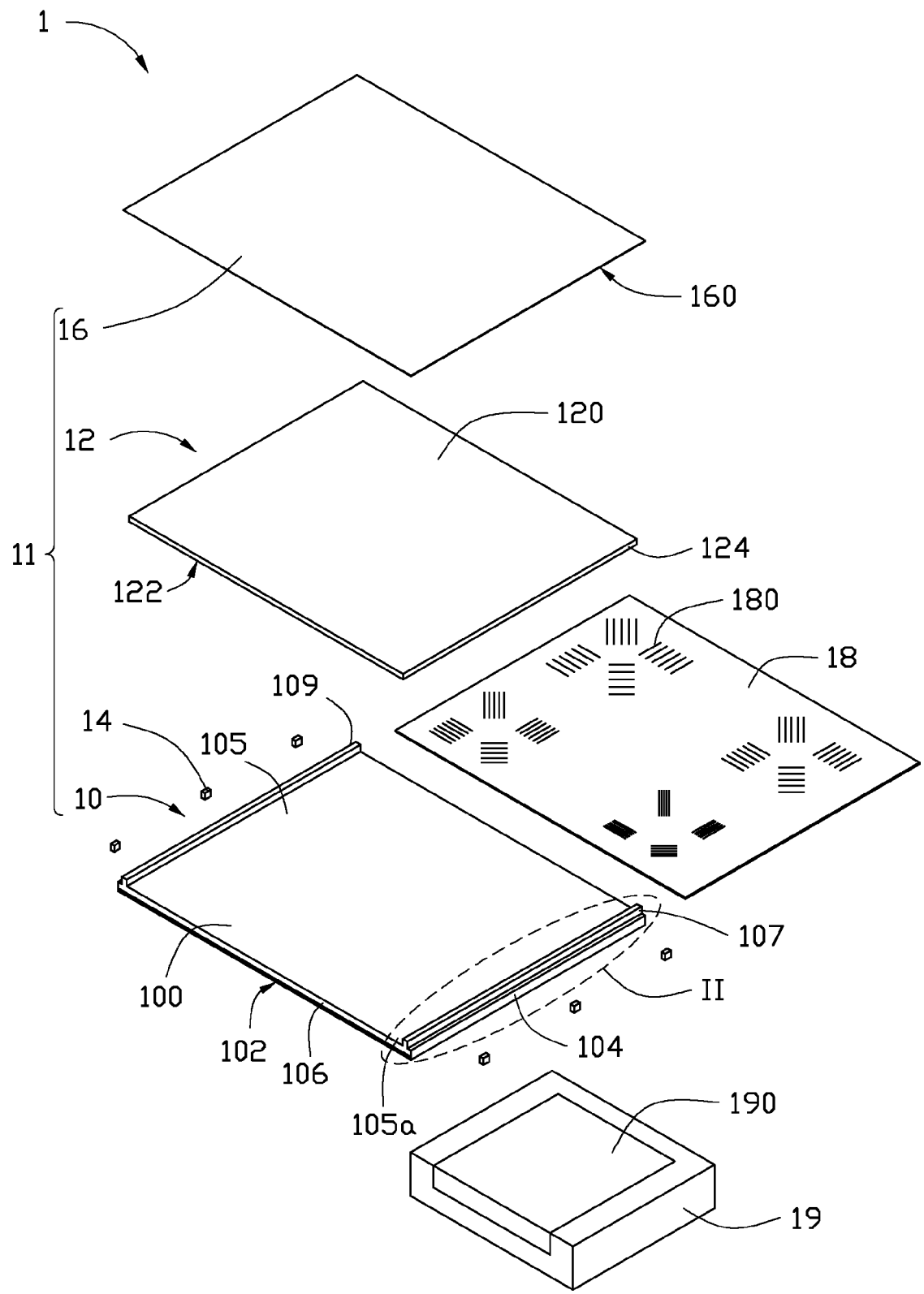
FIG. 1 is an exploded, schematic view of a lens testing device according to one embodiment.
Figure 2:
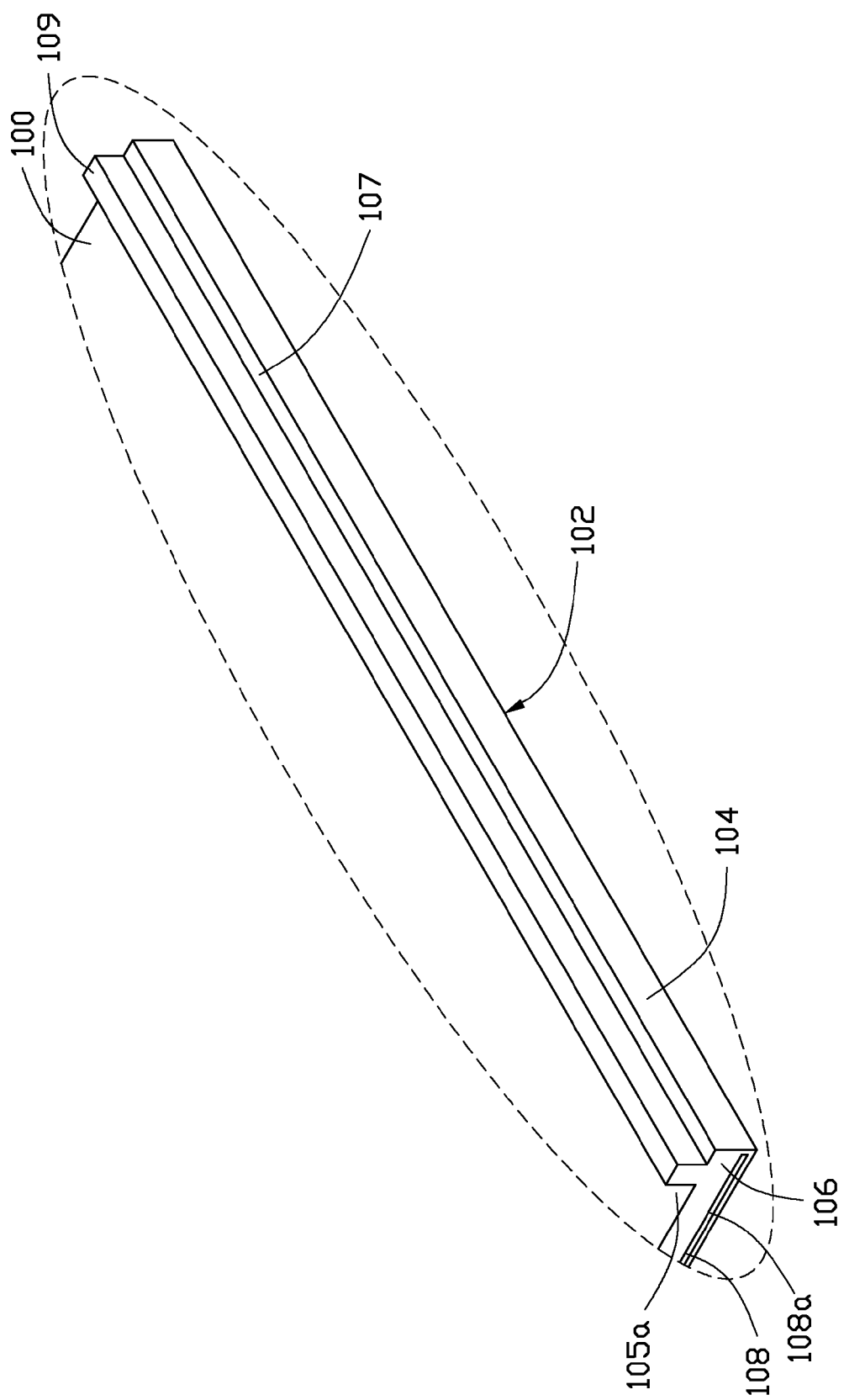
FIG. 2 is an enlarged view of a portion of II of FIG. 1.

Referring to FIGS. 1 to 5, a lens testing device 1 in accordance with one embodiment of the present disclosure is shown. The lens testing device 1 is configured to test a modulation transfer function of a lens 2. The lens testing device 1 includes a light source assembly 11, a pattern plate 18, and an imaging sensor 19. The light source assembly 11 includes a base plate 10, a light guide plate 12, a number of illuminants 14, and a reflective sheet 16.

The pattern plate 18 is made of transparent material and includes a number of stripe patterns 180 formed thereon. The stripe patterns 180 are configured to test the modulation transfer function of the lens 2. It is well known that the arrangement of the stripe patterns 180 on the pattern plate 18 can be different according to different kinds of the modulation transfer functions to be tested.

In this embodiment, the pattern plate 18 is substantially rectangular and the stripe patterns 180 are divided into four groups correspondingly formed at four corners of the pattern plate 18. Each group of stripe patterns 180 includes two pairs of stripes arranged perpendicular to each other. The density of each of the stripe pairs is different in each group.

The imaging sensor 19 includes a sensing surface 190 to sense the light incident thereon.

The base plate 10 is substantially rectangular and includes an upper surface 100, a lower surface 102, a pair of substantially parallel first side surfaces 106, a pair of substantially parallel second side surfaces 104, and a pair of substantially parallel positioning protrusions 109. The upper surface 100 is substantially parallel to the lower surface 102. The first side surfaces 106 are substantially perpendicularly connected to the upper surface 100 and the lower surface 102. The second side surfaces 104 are substantially perpendicularly connected to the upper surface 100, the lower surface 102, and the first side surfaces 106.

The positioning protrusions 109 are substantially elongated rectangular blocks and substantially perpendicularly extend outwards from the upper surface 100 near the opposite second side surfaces 104. The positioning protrusions 109 extend along a direction substantially perpendicular to the first side surfaces 106. The positioning protrusions 109 define a first receiving space 105 therebetween and a pair of second receiving spaces 107 at outer flank of the positioning protrusion 109. The first receiving space 105 goes through the first side surfaces 106.

The base plate 10 defines a through hole 108 passing through the first side surfaces 106 near the lower surface 102. The through hole 108 is below the first receiving space 105. The through hole 108 extends along a direction substantially perpendicular to the first side surface 106, and defines a pair of first openings 108a correspondingly on each of the first side surfaces 106. A width of each first opening 108a is approximately equal to a distance between the positioning protrusions 109. The base plate 10 is made of transparent material, for example glass or plastic.

The light guide plate 12 is a substantially rectangular plate and includes a pair of substantially parallel light incident surfaces 124, a first light reflecting surface 120, a light emitting surface 122, and a number of microstructures 122a. The first light reflecting surface 120 is substantially parallel to the light emitting surface 122. The light incident surfaces 124 are substantially perpendicularly connected to the first light reflecting surface 120 and the light emitting surface 122. The microstructures 122a are formed on the light emitting surface 122 spatially corresponding to the stripe patterns 180, and are configured to guide the light out of the light guide plate 12 from the light emitting surface 122. The microstructures 122a can be hemispherical bumps or hemispherical recesses.

The illuminants 14 can be fluorescent lamps, cold cathode fluorescent lamps, or light emitting diodes. In this embodiment, the illuminants 14 are six light emitting diodes.

The reflective sheet 16 is substantially rectangular and includes a second light reflecting surface 160. The second light reflecting surface 160 is substantially similar to the upper surface 100 in shape and size. A high reflection material is coated on the light reflecting surface 160.

Figure 4:
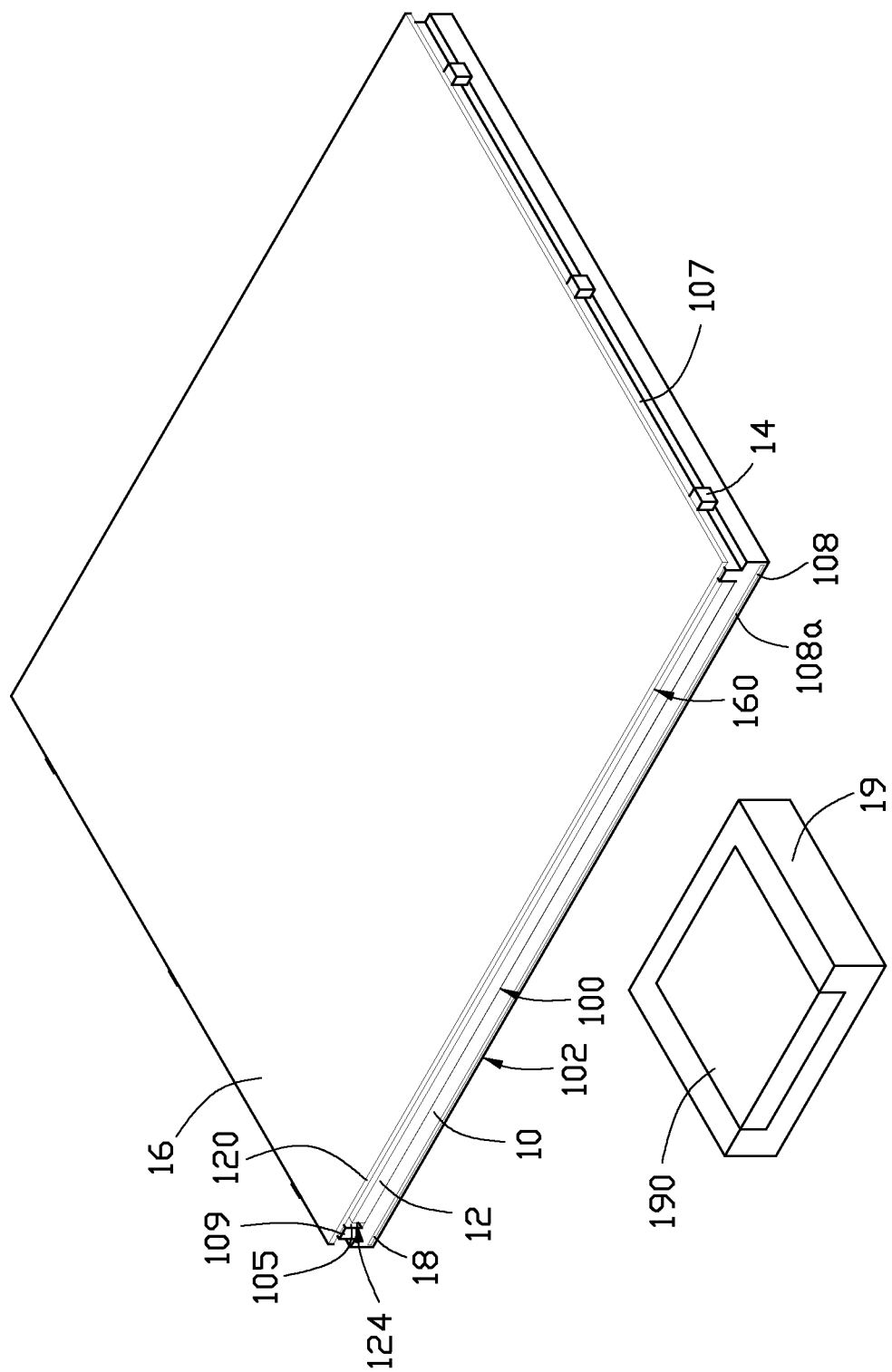
FIG. 4 is an assembled, schematic view of the lens testing device of FIG. 1.

In assembly, referring to FIG. 4, the light guide plate 12 is accommodated in the first receiving space 105. The light incident surfaces 124 correspondingly face the positioning protrusions 109. The light emitting surface 122 is placed on the upper surface 100. The illuminants 14 are accommodated in the second receiving spaces 107 and spaced with equal intervals. In this embodiment, each second receiving space 107 accommodates three illuminants 14.

The reflective sheet 16 is placed upon the upper surface 100 to cover the first receiving space 105 and the second receiving space 107. The second light reflecting surface 160 faces the first light reflecting surface 120 to further reflect the light escaping from the first light reflecting surface 120 back into the light guide plate 12. The reflective sheet 16 and two positioning protrusions 109 cooperatively define a pair of second openings 105a on the first side surface 106. The pattern plate 18 is accommodated in the through hole 108. The imaging sensor 19 is placed beneath the base plate 10 with sensing surface 190 facing the lower surface 102.

Figure 3:
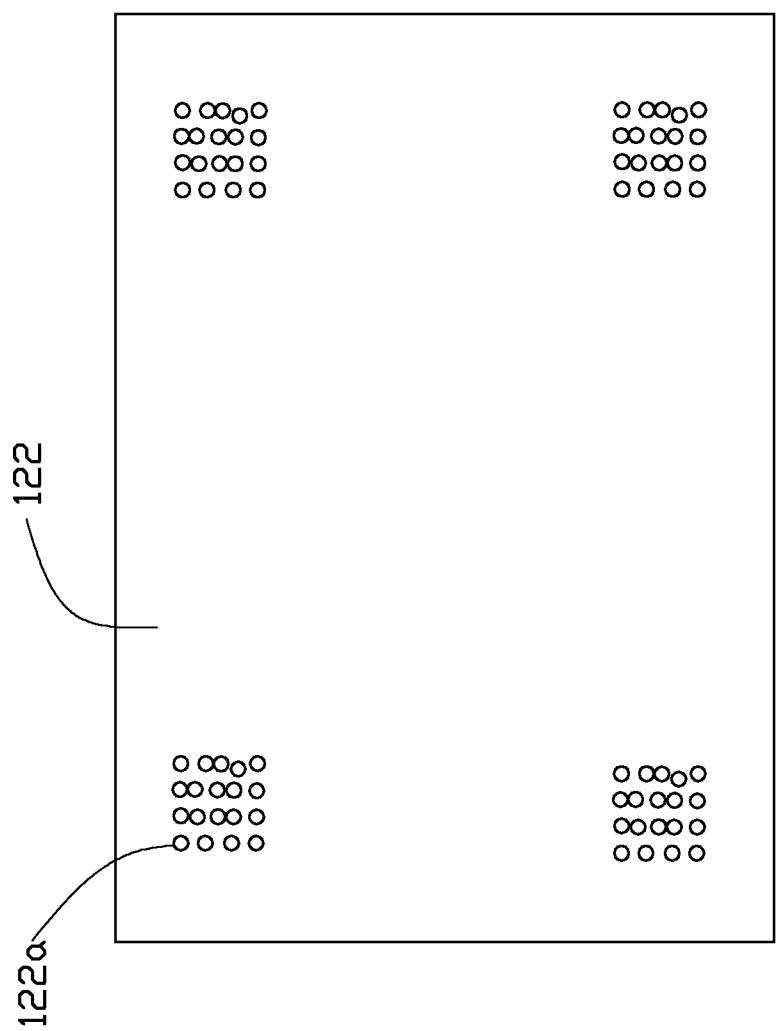
FIG. 3 is a schematic view of a number of microstructures formed on a light guide plate of FIG. 1.
Figure 5:
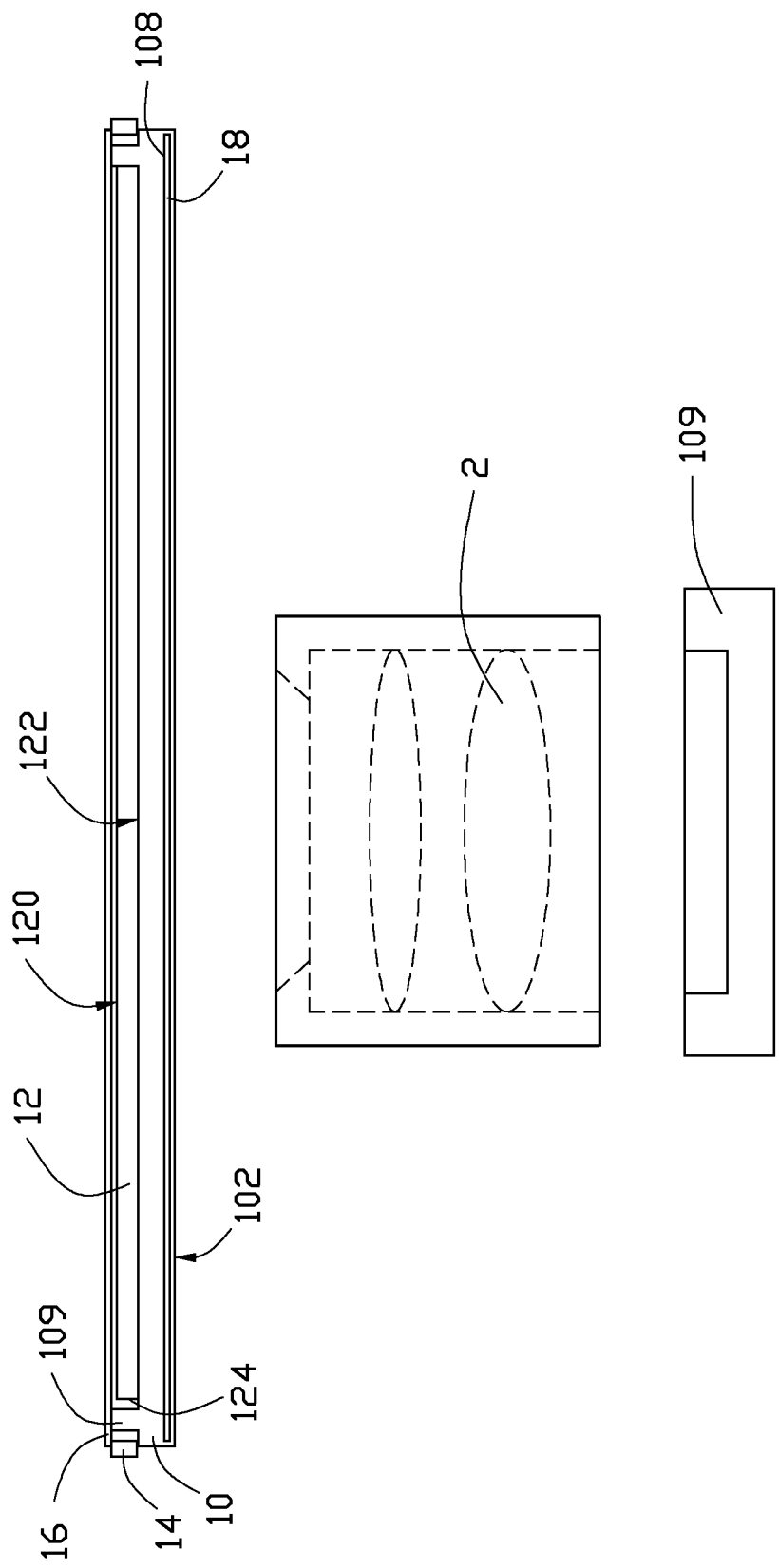
FIG. 5 is an assembled, schematic view of the lens testing device of FIG. 1 when the lens testing device is used to test a lens.

In use, referring to FIGS. 3 and 5, a light coming from the illuminants 14 passes through the positioning protrusions 109 and enters the light guide plate 12 from the light incident surfaces 124. The light is totally reflected back and forth between the first reflective surface 120 and the output surface 122 to uniformize the luminance of the light. The light is then guided out of the light emitting surface 122 of the light guide plate 12 by the microstructures 122a, enters the base plate 10, passes through the pattern plate 18 received in the through hole 108, and finally emits from the lower surface 102 of the base plate 10. The tested lens 2 focuses the light emitted from the base plate 10 onto the sensing surface 190 of the imaging sensor 19. The modulation transfer function of the lens 2 will be tested by analyzing the light sensed by the imaging sensor 19.

The pattern plate 18 can be easily changed by sliding it out from the first opening 108a. The corresponding light guide plate 12 can also be easily changed by sliding it out from the second opening 105a.

The light source assembly 11 uses the light guide plate 12 to uniformize the light from the illuminants 14 for illuminating the stripe patterns 180. Therefore, the uniformity of luminance on the pattern plate 18 can be improved and the light can be used more efficiently. Furthermore, the pattern plate 18 is well protected because the pattern plate 18 is accommodated in the light guide plate 12.

While various exemplary and preferred embodiments have been described, it is to be understood that the invention is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A light source assembly comprising:
   a transparent base plate comprising an upper surface and a pair of opposite first side surfaces perpendicularly connected to the upper surface, the transparent base plate defining a first receiving space in the upper surface and a through hole passing through the pair of first side surfaces;
   a pattern plate accommodated in the through hole and comprising a plurality of strip patterns formed thereon, the strip patterns configured to test a modulation transfer function of a lens;
   a light guide plate comprising two opposite parallel light incident surfaces, a light emitting surface perpendicular to the light incident surfaces, and a plurality of microstructures formed on the light emitting surface; and
   a plurality of illuminants;
   wherein the light guide plate is accommodated in the first receiving space with the light emitting surface facing the upper surface, the illuminants are placed on the upper surface and face the corresponding light incident surfaces for emitting light into the light guide plate, and the microstructures are configured to guide the light out of the light guide plate.

2. The light source assembly as claimed in claim 1, wherein the base plate further comprises a lower surface parallel to the upper surface and two opposite parallel second side surfaces, and the first side surfaces are perpendicularly connected to the upper surface, the lower surface, and the second side surfaces.

3. The light source assembly as claimed in claim 2, wherein the base plate further comprises two parallel positioning protrusions perpendicularly extending outwards from the upper surface adjacent to the second side surfaces, the positioning protrusions extend along a direction perpendicular to the first side surfaces, and the first receiving space is defined between the positioning protrusions.

4. The light source assembly as claimed in claim 3, wherein the positioning protrusions define two second receiving spaces at outer flanks of the positioning protrusions, and the illuminants are accommodated in the second receiving spaces and are equidistantly spaced from one another.

5. The light source assembly as claimed in claim 4, wherein the light guide plate further comprises a first light reflecting surface parallel to the light emitting surface.

6. The light source assembly as claimed in claim 5, further comprising a reflective sheet, wherein the reflective sheet comprises a second light reflecting surface covering the first receiving space and the second receiving space, the second light reflecting surface facing the first light reflecting surface.

7. The light source assembly as claimed in claim 1, wherein the illuminants are selected from the group consisting of fluorescent lamps, cold cathode fluorescent lamps, and light emitting diodes.

8. The light source assembly as claimed in claim 1, wherein the microstructures are selected from the group consisting of hemispherical bumps and hemispherical recesses.

9. The light source assembly as claimed in claim 1, wherein the through hole is spaced from and below the first receiving space.

10. The light source assembly as claimed in claim 1, wherein the stripe patterns are divided into four groups correspondingly formed at four corners of the pattern plate, and the microstructures spatially correspond to the stripe patterns.

* * * * *